United States Patent
Barker et al.

(10) Patent No.: US 11,625,605 B2
(45) Date of Patent: Apr. 11, 2023

(54) SELECTING COMPUTATIONAL KERNEL VARIANTS USING NEURAL NETWORKS

(71) Applicant: Nvidia Corporation, Santa Clara, CA (US)

(72) Inventors: Jonathan Edward Barker, Boulder, CO (US); Christopher Thomas Cheng, Santa Clara, CA (US); Paul Martin Springer, Iserlohn (DE); Wojciech Jablonski, Warsaw (PL)

(73) Assignee: Nvidia Corporation, Santa Clara, CA (US)

( * ) Notice: Subject to any disclaimer, the term of this patent is extended or adjusted under 35 U.S.C. 154(b) by 594 days.

(21) Appl. No.: 16/723,608

(22) Filed: Dec. 20, 2019

(65) Prior Publication Data

US 2021/0192334 A1    Jun. 24, 2021

(51) Int. Cl.
*G06N 3/08*   (2006.01)
*G06F 17/16*  (2006.01)
*G06F 7/57*   (2006.01)
*G06N 3/04*   (2023.01)

(52) U.S. Cl.
CPC ............ *G06N 3/08* (2013.01); *G06F 7/57* (2013.01); *G06F 17/16* (2013.01); *G06N 3/04* (2013.01)

(58) Field of Classification Search
CPC .......... G06N 3/08; G06N 3/04; G06N 3/0481; G06N 3/063; G06N 3/084; G06N 3/105; G06N 20/00; G06F 7/57; G06F 17/16; G06F 9/5005; G06F 7/523; G06K 9/6256
See application file for complete search history.

(56) References Cited

U.S. PATENT DOCUMENTS

| | | | |
|---|---|---|---|
| 6,658,395 B1* | 12/2003 | Barnhill | G06N 20/10 706/45 |
| 7,069,256 B1* | 6/2006 | Campos | G06F 16/2457 706/16 |
| 10,990,650 B1* | 4/2021 | Vantrease | G06N 3/08 |
| 2002/0015401 A1* | 2/2002 | Subramanian | H04L 27/0008 370/332 |
| 2013/0297321 A1* | 11/2013 | Raux | G01C 21/3644 704/275 |
| 2014/0066320 A1* | 3/2014 | Heckerman | G16B 20/20 506/8 |
| 2014/0135970 A1* | 5/2014 | Kaushal | G05B 19/41875 700/121 |
| 2016/0335120 A1* | 11/2016 | Gupta | G06F 9/5044 |
| 2018/0052685 A1* | 2/2018 | Ouyang | G06F 9/3824 |
| 2019/0122113 A1* | 4/2019 | Chen | G06N 3/084 |
| 2020/0065941 A1* | 2/2020 | McGuire | G06T 5/004 |
| 2021/0319146 A1* | 10/2021 | Reinhart | G06F 30/27 |

* cited by examiner

*Primary Examiner* — Farley Abad
(74) *Attorney, Agent, or Firm* — Hogan Lovells US LLP

(57) ABSTRACT

Apparatuses, systems, and techniques to optimize kernel selection for performing a computation. In at least one embodiment, a neural network is trained and utilized to generate a list of kernels so that an (e.g., optimal) kernel may be identified. The neural network receives characteristics of the input matrices and determines relevancy scores for a list of possible kernels. Based on an ordered listing of kernels by relevant score, a kernel is selected from the list and utilized to perform the computation and provide the result.

20 Claims, 9 Drawing Sheets

SELECTING COMPUTATIONAL KERNEL VARIANTS USING NEURAL NETWORKS

FIELD

The present application relates generally to selecting an optimal kernel to perform computations on one or more sets of mathematical inputs, such as one or more matrices. For a given computation, multiple methods may be employed to perform the operation. Often, the performance of a method may be contingent on a number of factors that affect the run-time of the method. Therefore, selection of a kernel for a given set of constraints can greatly affect performance of application requesting the operation.

BACKGROUND

When a computation on a matrix or set of matrices is performed, a number of factors can affect the time it will take to complete the computation. Because multiple kernels may exist for performing the operation, it is often difficult to assess which of the kernels to utilize to perform the operation. By selecting an inefficient kernel to perform a computation, performance may be less than optimal. Therefore, selection of an optimal kernel is important in maximizing computation performance. However, the time and resource cost of selecting a kernel must be minimized in order to prevent the selection process from taking up more time than would be saved in using a possibly sub-optimal kernel.

DETAILED DESCRIPTION

When requesting a matrix computation, applications may not have knowledge of the various kernels that may be used to perform the computation. As used herein, "kernel" refers to any low-level routine that performs a mathematical computation on input data. For a given operation, multiple kernels may exist to perform the operation and each can be written to optimize performance for some input data. For example, an application may require a general matrix multiply (GeMM) without interest in how the operation is performed. Instead, the application only has interest in the operation being performed as quickly as possible. Because many operations may have multiple kernels that can be used to perform the operation, selection of the optimal kernel—with the least amount of time required to select the optimal kernel—can greatly reduce run-time for the requested computations.

Because the performance of many kernels can be affected by various factors, a deep neural network can be trained to rank a set of kernels based on input factors. The input factors may include characteristics of the input matrices and/or the hardware that is executing the kernel. The DNN may then provide a list of kernels that are ranked based on the likelihood of being an optimal kernel for the computation and the computation can be executed with one of the kernels selected based on the ranked list.

However, although DNNs may improve the time it takes to select an optimal kernel to perform an operation, significant training of the DNN is required to accurately predict kernel relevancies. Because training is a time and resource intensive process, the training data that is provided to the DNN should be limited to those training sets that are most significant in training the DNN. Therefore, training the DNN presents its own issues related to choosing the right training data to generate. Because the inputs may be of any size (up to the upper constraints of the hardware), generalizing a training set that is meaningful poses a difficult problem.

Therefore, a DNN that is accurate in predicting an optimal kernel while still being efficient in making the selection is highly advantageous. Further, the training input to the DNN must be selected so that the training is done efficiently while still maintaining an accurate prediction by the DNN when in operation. Thus, in addition to an initial training set of input data, the predictions made by the DNN may be utilized to identify one or more sets of inputs that are of particular difficulty in predicting a computation kernel. The DNN may then be further trained with generated training data that conforms to those trouble areas.

Figure 1:
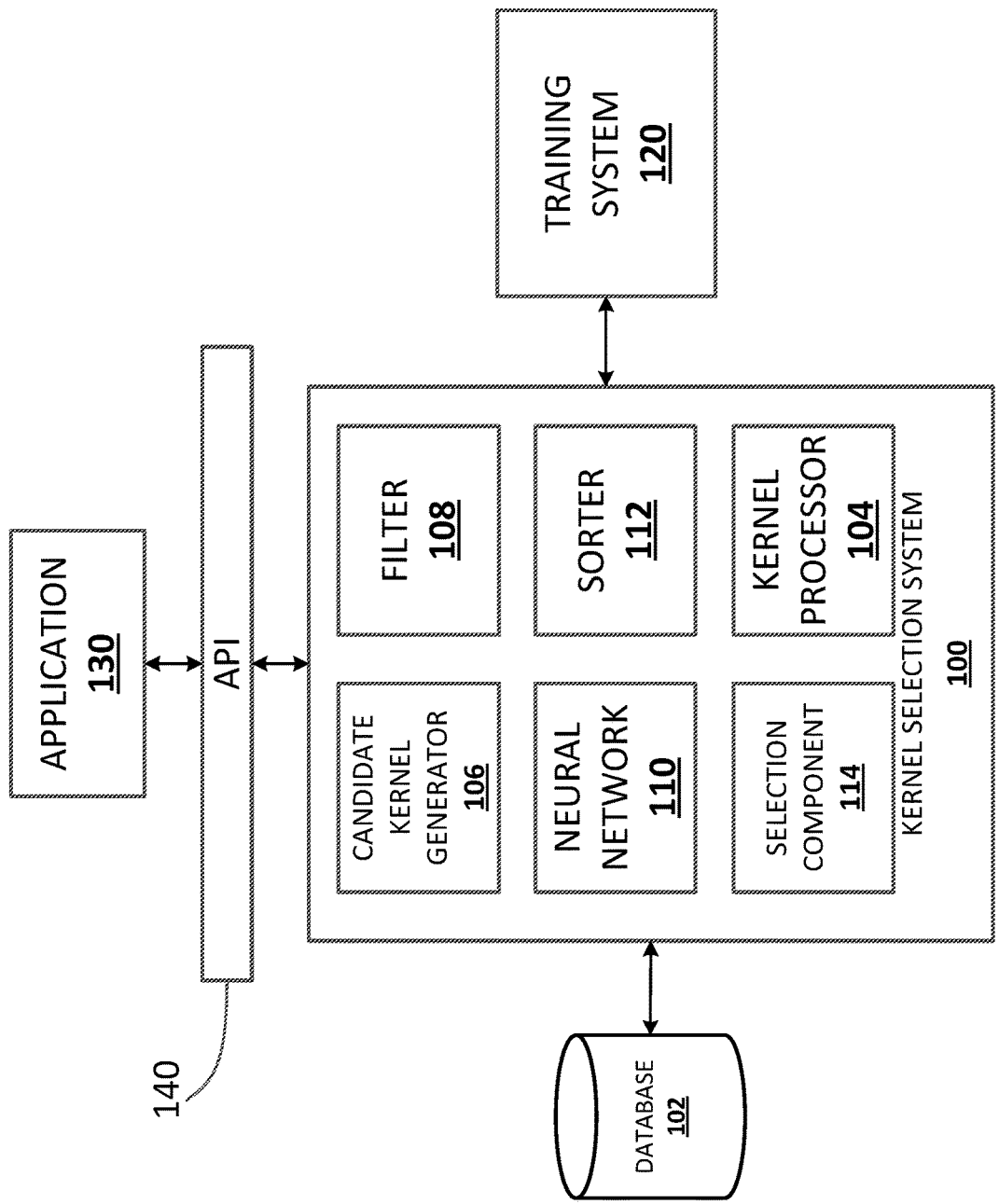
FIG. 1 illustrates an example environment in which embodiments described herein may be implemented.

FIG. 1 is an illustration of an example environment where embodiments described herein may be implemented. The environment includes a kernel selection system 100, a neural network training system 120, a client application 130, and an application programming interface (API) 140. The API can be utilized by the application 130 to communicate with the kernel selection system 100 via a network, such as the Internet, a local area network (LAN) and/or other networks. The API 140 allows the application 130 to communicate with the kernel selection system 100 without requiring the application 130 to have knowledge of how the kernel selection system 100 operates. Thus, the application 130 can submit a request for a computation along with one or more parameters, such as input data for a kernel, and receive a result in response.

The database 102 includes a plurality of kernels that may be utilized to perform one or more operations that are requested by an application 130 via the API 140. Each kernel may be associated with a particular computation and may be utilized with provided input data to produce a result. For example, a kernel stored in database 105 may be associated with a general matrix multiplication (GeMM) computation. The GeMM kernel may then be utilized by an execution component, such as kernel processor 104, which can perform the computation utilizing the GeMM kernel. In some embodiments, the database 102 may include a plurality of kernels for a given computation. For example, database 102 may include kernels $K_1 \ldots K_n$ for performing a GeMM computation, each using a different method for producing the same result.

Kernel processor 104 is a component that executes a kernel to calculate a computation result for a given set of inputs. In some embodiments, kernel processor 104 may be the same processor that is executing the kernel selection engine 100. In some embodiments, both the kernel processor 104 and the processor that is executing the kernel selection engine 100 may be separate processors and/or processors that are incorporated into the same system. For example, kernel processor 104 may be a graphics processing unit (GPU) operating on the same system as one or more separate processors that are executing the kernel selection engine 100.

The candidate kernel generator 106 determines one or more candidate kernels that may be utilized by the kernel processor 104 to determine a result computation. The candidate kernel generator 106 identifies the kernels in database 102 that are available to execute the operation that has been received in a request as well as characteristics of the input data. For example, one or more kernels may be constrained in the size of the matrices that may be used as input to calculate a result and/or one or more of the kernels may be specific to a particular computation. Thus, candidate kernel generator 106 can determine a list of the kernels stored in the database 102 that may be utilized to provide the application 130 with a result.

Filter 108 removes any kernels from the list of candidate kernels that are not practical and/or impossible to execute given particular restraints of the system. For example, filter 108 may identify the hardware constraints of kernel processor 104 and determine that, for a given kernel, the kernel processor 104 does not have (or is unlikely to have) the resources to process the given inputs with that kernel. Thus, filter 108 can remove the kernel from the candidate kernel list so that the neural network does not process that kernel as a potentially optimal kernel.

Once a candidate list of kernels has been determined, the neural network 110 is provided the list along with the input data. The neural network is trained to determine, based on the list of candidate kernels, a relevancy score for each of the kernels that is predictive of how a given kernel will perform a computation on the input data. The neural network may be trained by a training system 120 as further described herein.

Sorter 112 sorts the candidate kernels by relevancy based on the output of the neural network. For example, for a given list of kernels with relevancy scores, sorter 112 can sort the list so that the first kernel in the list is the most relevant kernel for performing a computation on the input data. Selection engine 114 then chooses a kernel from the sorted list, such as the kernel with the highest relevancy score. The selected kernel is then provided to the kernel processor 104, which can execute the computation using the selected kernel and the input data. The results of kernel processor 104 may then be provided to application 130 via API 140.

Figure 2:
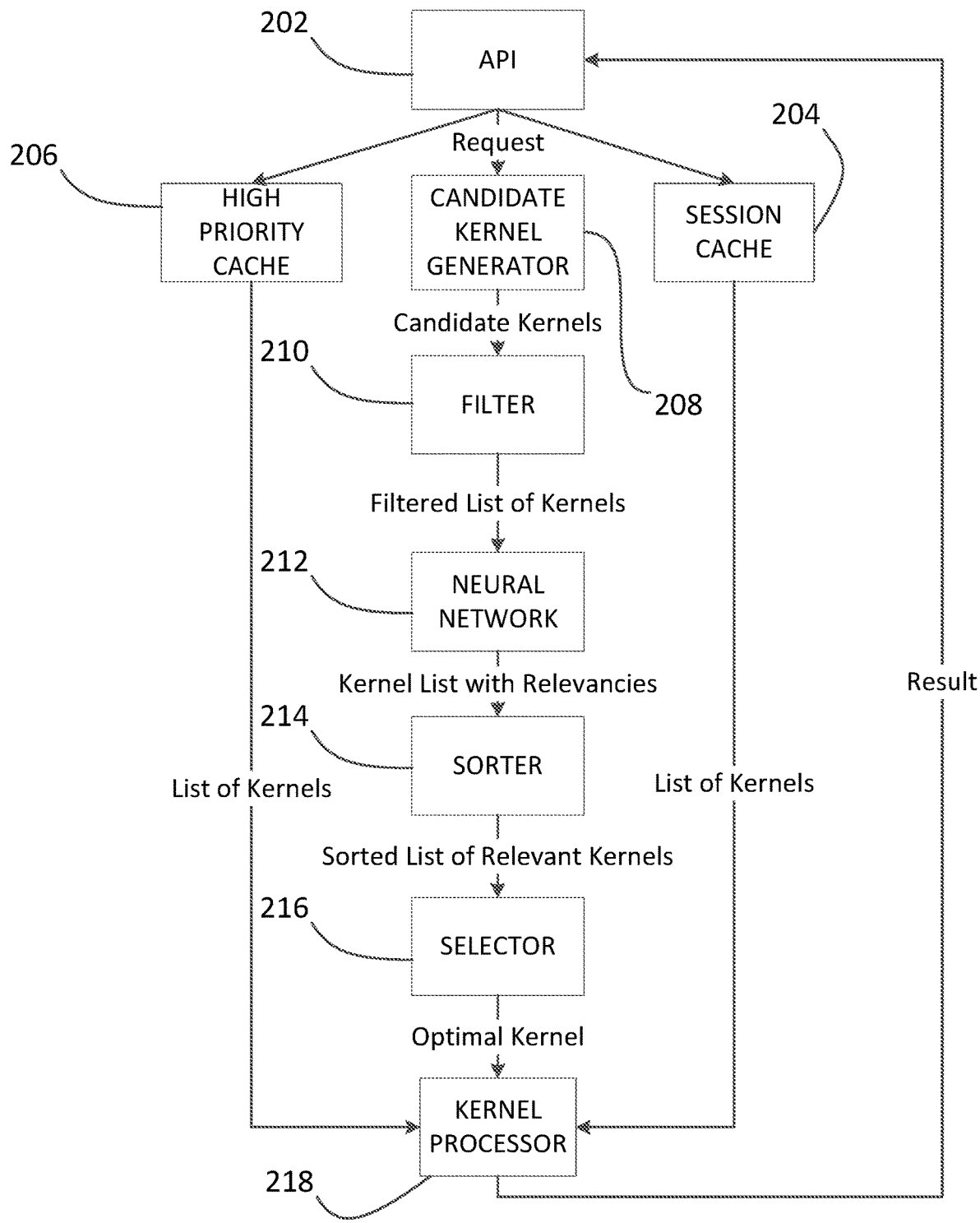
FIG. 2 illustrates an example data flow according to embodiments described herein.

Referring to FIG. 2, a flowchart is provided that illustrates the processing of input data into a ranked list of kernels to perform a computation. The application first provides input data to the API 202. This input data can include matrices, matrix sizes, and/or other input that describes the input matrices or computation to be performed. In some embodiments, the computation has already been performed. Thus, a session cache 204 can be maintained that includes result computations for matrices that have already been provided within the session. By maintaining a cache, results can be immediately provided to the application without additional computation and/or the use of the neural network. In some embodiments, the input may be provided to a high priority cache if an exact result is required. According to such embodiments, the high priority cache does not utilize the neural network in selecting a kernel but instead directly provides a ranked list of kernels to the selection component 114 for processing by the kernel processor 104. Because the number of possible kernels is very large, the high priority cache may not include all possible kernels and may take more resources to execute than utilizing the neural network. Thus, the high priority cache may be utilized in limited instances where the neural network will not perform as required.

If neither of the caches is utilized to generate a ranked list of kernels, a list of kernels is generated. The generation of the list of candidate kernels may be performed by a component that shares one or more characteristics with candidate kernel generator 106. Once the candidate kernels are generated, the list is provided to a filter 210, which can remove any kernels that are impossible or impractical to execute given one or more constraints, such as hardware constraints of the executing processor. The filtered list of kernels is then provided to the neural network 212. In some embodiments, the filtered list of kernels can be provided to the neural network along with additional information, such as derived features that characterize the kernels and/or the input, the computation that is being requested, and/or specific hardware specifications for target execution hardware. The neural network generates a predicted ranking score, or relevancy score, for each of the kernels. The resulting list of kernels is then sorted 214, and a ranked list of kernels 216 is generated. The ranked list of kernels 216 can then be utilized by a selection component, such as selection component 114, to execute a computation and provide the application with a result.

Although utilizing a neural network to select a kernel for performing a computation can result in faster and more efficient performance, training the neural network must also be efficient given the limited resources and time required to successfully train the network. Further, the trained neural network must be trained such that the results are overall accurate and lead to proper generalization of potential input data sets. For example, the input space for computations may be infinitely large since matrices of any size can be provided as input. Thus, it is impossible to train the neural network on all possible inputs. Therefore, selecting the best training data, or identifying training data that has the most impact on training the neural network, can lower the cost of training the neural network while still resulting in a neural network that can effectively rank kernels, as described herein.

Figure 3:
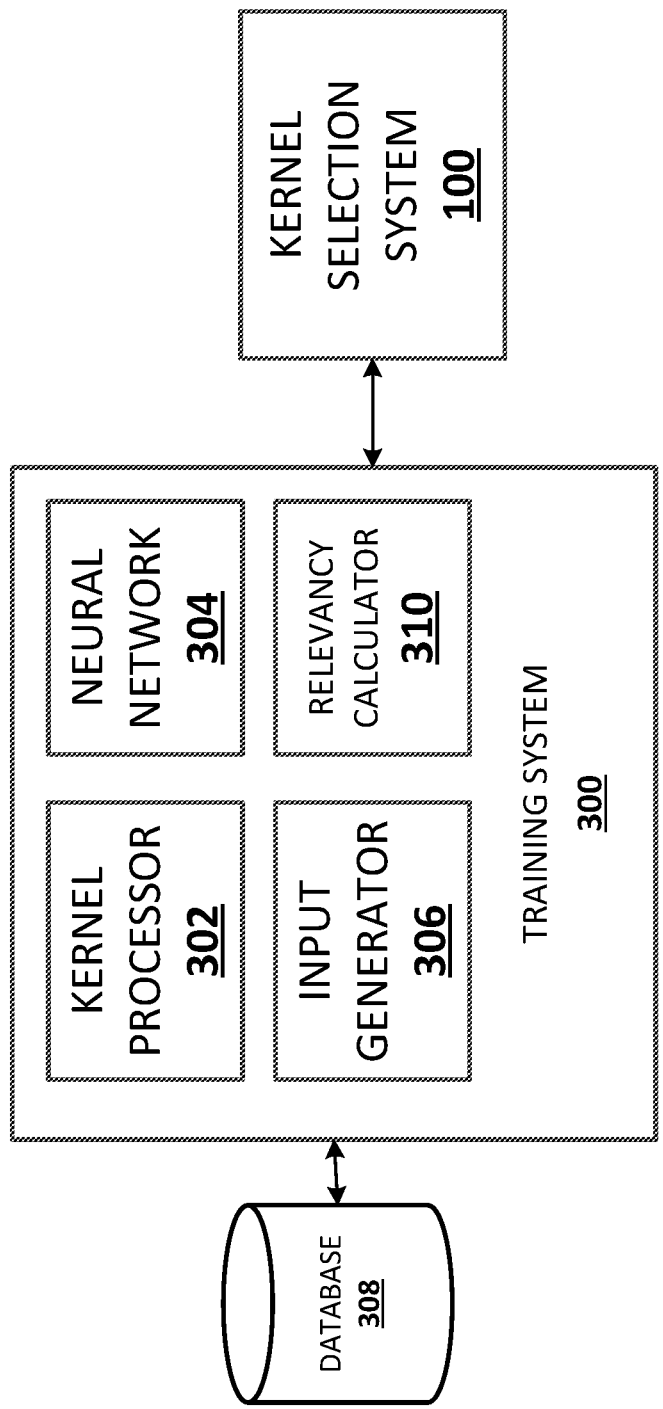
FIG. 3 illustrates an example environment in which embodiments described herein may be implemented.

FIG. 3 is an example environment that may be utilized to train a neural network to rank kernels to perform a computation. The training system 300 can be the same system as illustrated in FIG. 1 as training system 120. The training system includes a kernel processor 302, which may be the same, or share characteristics with kernel processor 104 of FIG. 1. In some embodiments, multiple kernel processors, each with varying hardware specifications, may be included in the training system 300. For example, a kernel may be executed on various processors, each with varying behavioral characteristics and the characteristics of the processor may be provided as training data to the neural network 304 along with input data, computation results information, and/or other neural network input. The neural network 304 may be the same and/or share similar characteristics with the neural network 110 of FIG. 1.

Input generator 306 generates matrix characteristics to be used as training input for the neural network 304. The training input can include characteristics of one or more matrices that may be provided in a request to perform a mathematical operation. For example, characteristics of two matrices may be generated on which a general matrix multiplication (GeMM) could be performed. In some embodiments, the input generator 306 may generate random matrix characteristics. However, as previously mentioned, the input space is infinite. Therefore, in some embodiments, input generator 306 can receive input from one or more other components to better ensure that the input generated is of importance to training the neural network 304.

Kernel database 308 includes a plurality of kernels, each of which can perform a computation on a set of input matrices. For each training input, each of the plurality of kernels stored in kernel database 308 may be provided to the kernel processor 302 to perform a computation. For example, kernel database may include kernels $K_1 \ldots K_n$, each of which can be provided to kernel processor 302 (or provided to a plurality of kernel processors) to generate a result set. The result set may include information regarding the execution of the training input on the kernel processor 302. The result set may include, for example, for each kernel executed on a processor, processor information, run-time for the kernel, and/or a class for the training input.

Input class may include characteristics of a matrix that identifies the matrix as being part of a particular sub-space within the space of possible inputs. For example, some matrices may be difficult to model, which may constitute a class of matrices. In some embodiments, a class of matrices may be a sub-space of matrices whereby small changes in the matrices result in significant changes in the optimal kernel for performing the computation.

Relevancy calculator 310 determines a relevancy score for each of the kernels in the result set based on the run-time of the kernel while executing the matrix computation. The relevancy score may be, for example, a numerical value between 0 and 1, with 1 indicating the kernel was perfectly relevant and 0 indicating the kernel was impossible. Thus, a kernel with a relevancy score of 0.25 may have performed worse (e.g., taken longer to run) than a kernel that is assigned a relevancy score of 0.75. The result set may then be ranked according to relevancy scores for further processing.

The result set and the training input can be provided to the neural network as training data. The neural network may then process the input to determine a predicted relevancy score for each of the kernels, which then can be ranked into a predicted ranking of the kernels. In some embodiments, hardware behavior information, indicative of the processor used to perform the computations, can be provided with the training input and ranked result set. Thus, when a computation is requested from the neural network 304, the hardware specification can be provided with input such that the neural network can take into account hardware differences when generating a predicted list of kernels.

In some embodiments, additional training input can be generated based on the output of the neural network 304 during training. The additional input may be generated by the input generator 306 based on information related to a class of the input data. For example, training input may be provided to the neural network for training and the predicted ranking of the kernels may be compared to the actual ranking of the kernels. If the lists differ, or differ by more than a threshold difference, a class may be determined for the training input, and a signal may be provided to the input generator 306 to generate additional training input related to that class. Thus, the neural network 304 can then be provided additional training input to assist the neural network 304 in reducing the difference between an actual ranked list and the predicted ranked list. By doing so, the subsequent training input can be better tailored to those instances where the training input most affects incorrect (or sub-optimal) output.

In some implementations, the difference between the predicted list and the actual result list may be determined using a list-based loss function. For example, a Jensen-Shannon divergence and/or a symmetrized Kullback-Liebler divergence can be utilized to determine a loss between the actual and predicted results. In instances where the loss is significant for a class of matrices (e.g., the neural network performs poorly on a set of matrices), additional training input to the neural network may include more training input of that class of matrices when the top predicted result does not match the actual top result kernel (or, for example, the actual optimal kernel is not within a threshold ranking from the top of the predicted results). This may include updating the weight factor for one or more classes of matrices such that the neural network will receive more training input of that class than other classes that have a lower weighting factor in the training data.

In some embodiments, two or more training inputs that belong to the same class are identified. Each of the training inputs may be processed as described herein and the accuracy of each of the predicted results can be determined. If the difference between the accuracy of the predicted results of one training input and the accuracy of the predicted results of one or more of the other predicted results is mathematically significant, additional training input of the same class may be generated and provided to the neural network as training input.

In some embodiments, the training input may be generated to ensure that the training data spans a significant portion of the training input space. For example, due to the hardware constraints of the processor that executes the kernels, matrix size may be limited to a particular maximum size. Thus, the training input for the neural network should include matrix sizes that match the possible input that may be received for processing by the neural network.

Figure 4:
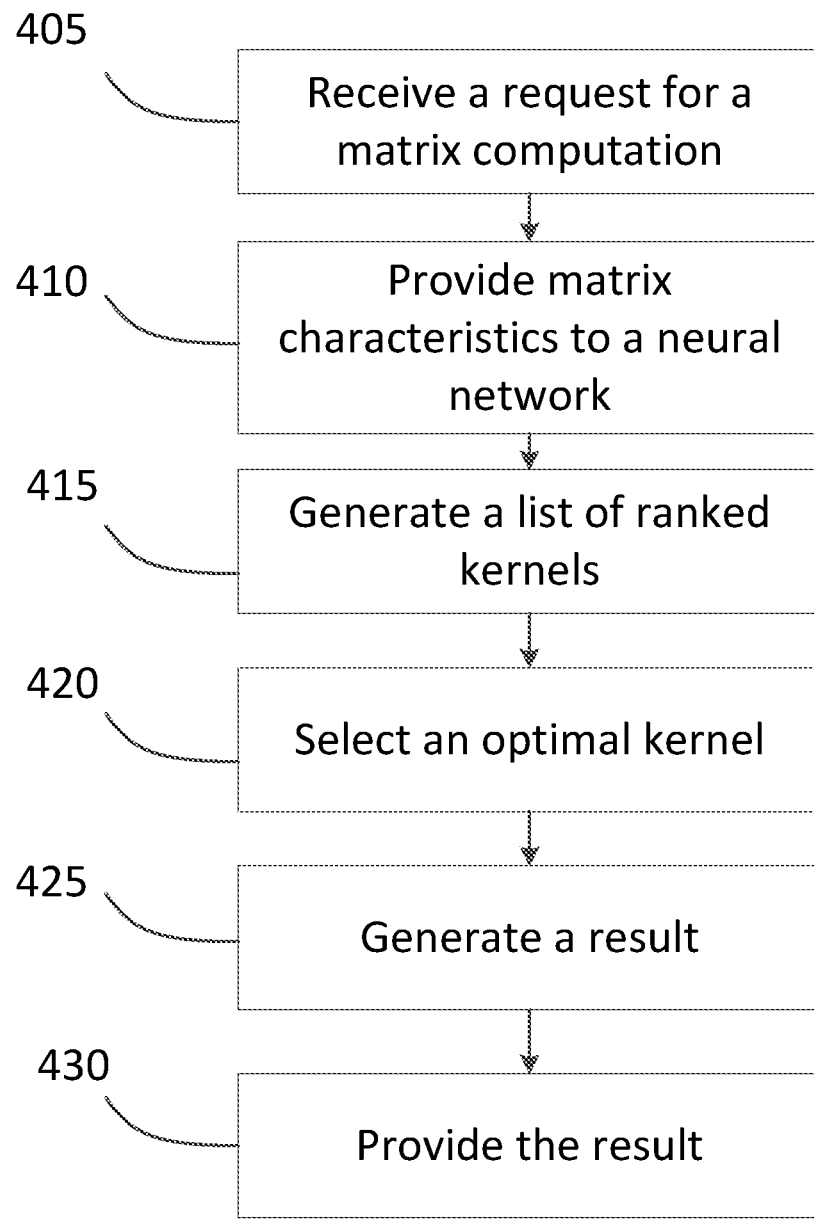
FIG. 4 illustrates a flowchart of one or more embodiments.

Referring to FIG. 4, a flowchart is provided illustrating an example embodiment as described herein. Some embodiments may have more or fewer steps, and/or may perform one or more steps in a different order. The method illustrated in FIG. 4 may be performed by an environment that shares one or more characteristics with the environment illustrated in FIGS. 1-3, as described herein.

At step 405, a request for a matrix computation is received. The request may be received via an application programming interface (API), such as API 140 of FIG. 1. The request can include one or more matrices, a type of computation to perform, and/or other characteristics of input matrices. In some embodiments, an application may request the computation from a library of API functions.

At step 410, characteristics of the one or more matrices are provided to a trained neural network. The characteristics may include, for example, dimensions of the input matrices, a characterization of the matrices, and/or other characteristics that describe the inputs. The neural network is trained to generate a ranked list of candidate kernels that may be utilized to perform a matrix computation. In some embodiments, the neural network may be trained using one or more embodiments described herein. For example, the neural network can be trained using a training system 300, as illustrated in FIG. 3.

At step 415, the neural network generates a ranked list of kernels to perform the requested computation. For example, the neural network can determine a relevancy score for each of the kernels in a list of kernels. A relevancy score can be indicative of how likely a kernel is an optimal kernel for performing the computation. At step 420, the optimal kernel is selected. The optimal kernel may be, for example, the kernel that is assigned the highest relevancy score by the neural network.

At step 425, the optimal kernel is utilized to generate a result. The result may be generated by a processor that is configured to perform matrix computations. For example, the result may be generated by a processor that shares one or more characteristics with kernel processor 104. At step 430, the result is provided in response to receiving the request. The result may be provided via an API, such as API 140 of FIG. 1.

Figure 5:
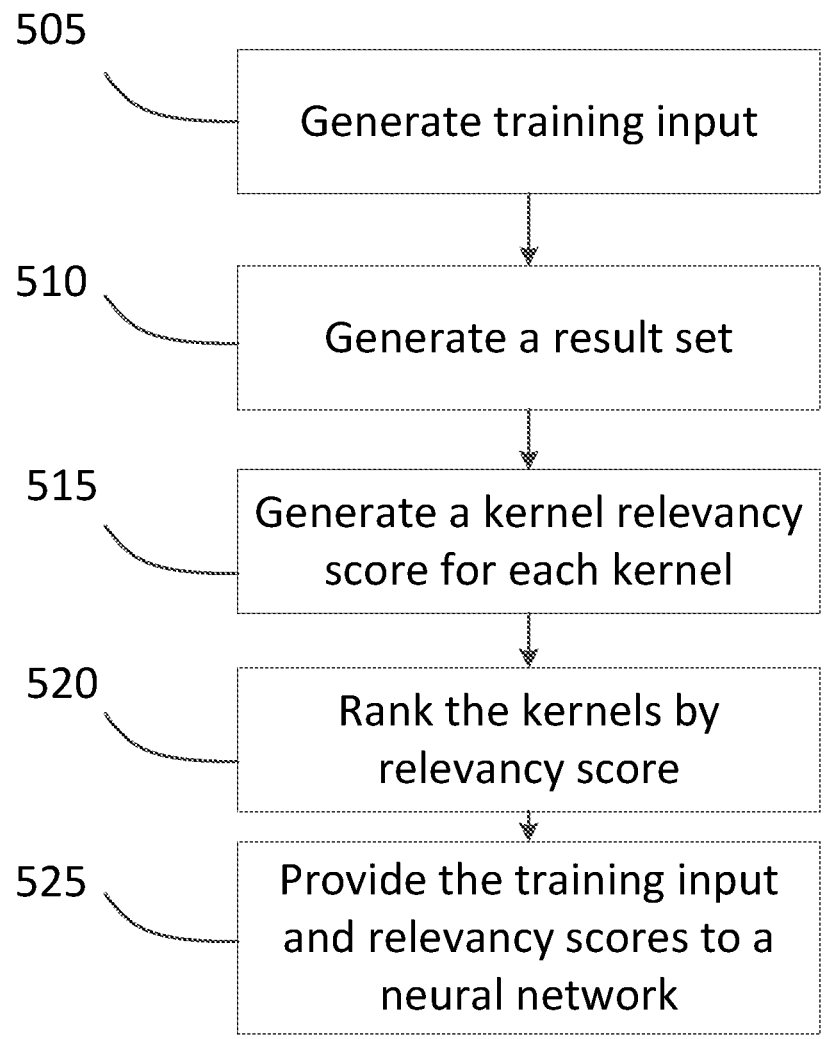
FIG. 5 illustrates a flowchart of one or more embodiments.

Referring to FIG. 5, a flowchart is provided illustrating an example embodiment as described herein. Some embodiments may have more or fewer steps, and/or may perform one or more steps in a different order. The method illustrated in FIG. 5 may be performed by an environment that shares one or more characteristics with the environment illustrated in FIGS. 1-3, as described herein.

At step 505, training input is generated. The training input may include characteristics of one or more matrices that may be provided in a request to perform a calculation. The training input is generated to train a neural network to assign relevancy scores to one or more kernels so that an optimal kernel may be selected. The matrices may be randomly generated and may be of random sizes. In some embodiments, the generated training input may be limited based on limitations of hardware of one or more processors that are executing one or more kernels to compute a result. For example, the training input may be generated by a component that shares one or more characteristics with input generator 306 of FIG. 3. The input generator may determine hardware specifications for the kernel processor 302 and limit the training input to only matrices that are within the capabilities of the kernel processor 302. In some embodiments, training input may be generated based on one or more other constraints, as described herein.

At step 510, a result set is generated for the training input. The result set includes one or more kernels that can be utilized to perform a computation on the result set. For example, the result set may include kernels that can be utilized to perform a general matrix multiplication. Each kernel can be utilized by a processor to generate a result, and the run-time for performing each computation can be included with the result set. At step 515, a relevancy score is assigned to each kernel in the result set that is indicative of the quality of performance of that kernel in performing the computation. Thus, kernels with faster run-times may be assigned a higher score than kernels that performed slower. At step 520, the kernels can be ranked based on run-times and/or assigned relevancy scores.

At step 525, the training input and relevancy scores are provided to a neural network for training. The neural network is trained to receive characteristics of one or more matrices as input and generate a ranked list of kernels, ranked by relevancy scores. In some embodiments, the neural network can be utilized to select an optimal kernel from a candidate list of kernels based on input.

In some embodiments, the output of the neural network can be utilized to further generate training input. For example, in instances where the neural network does not select an optimal kernel, additional training input can be generated that is of a similar class as the input that led to the sub-optimal result. In some embodiments, one or more classes of inputs may be assigned weights that are indicative of the frequency that the neural network is provided training input from that class. Thus, when future training input is generated, the training input can be limited to input that improves the performance of the neural network.

In some embodiments, training input may be provided to the neural network and the performance of the neural network in determining a list of kernels may decrease (e.g., take more time to make a list, predicting a list of kernels that is less optimal than before training). In those instances, the state of the neural network may be reset to a pre-training state and the training input and/or a class of the training input may be removed from future training input generation.

Figure 6:
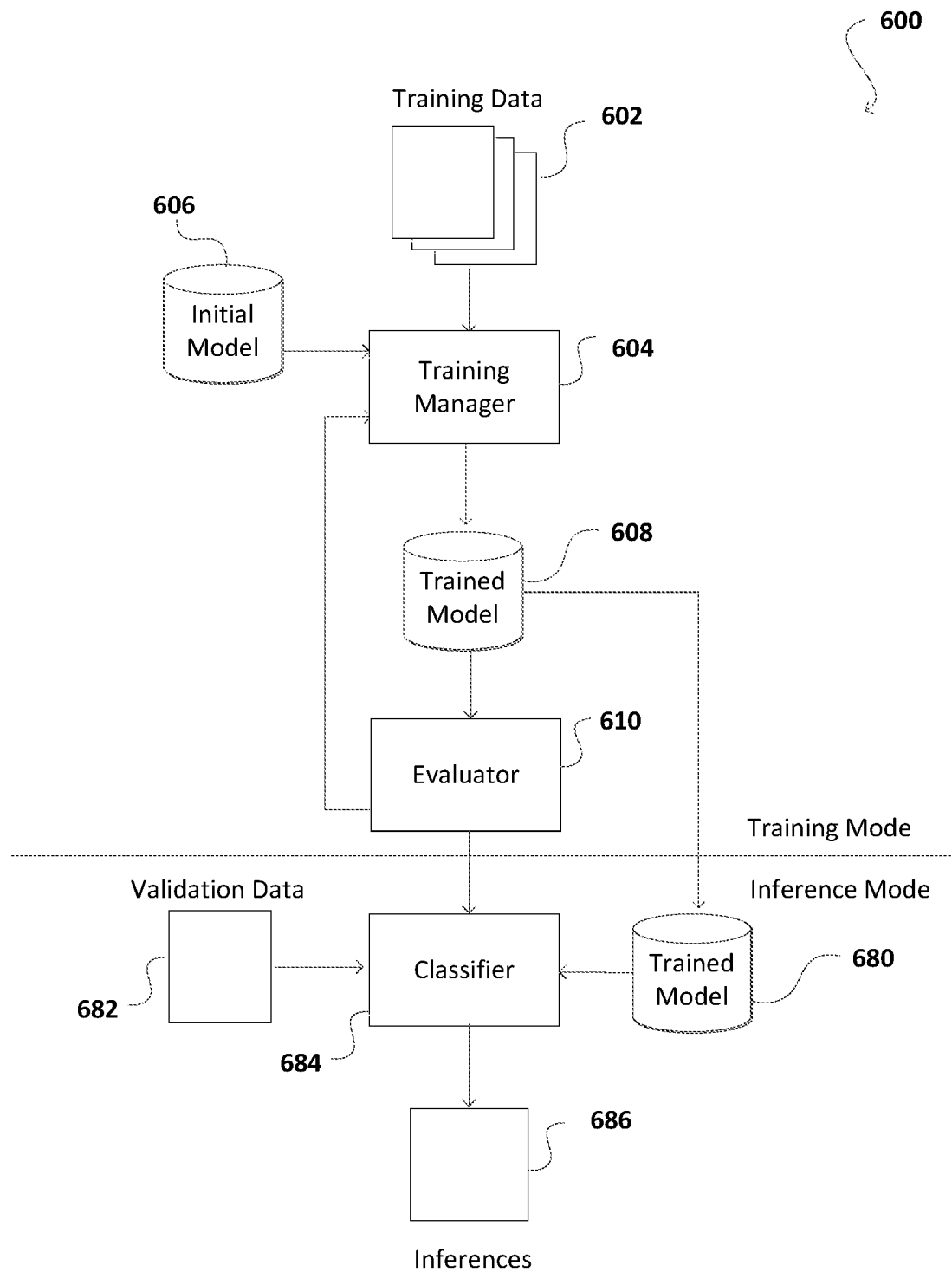
FIG. 6 illustrates a system for training an image synthesis network that can be utilized, according to at least one embodiment.

FIG. 6 illustrates an example system 600 that can be used to classify data, or generate inferences, in at least one embodiment. In at least one embodiment, both supervised and unsupervised training can be used in at least one embodiment discussed herein. In at least one embodiment, a set of training data 602 (e.g., classified or labeled data) is provided as input to function as training data. In at least one embodiment, training data can include instances of at least one type of object for which a neural network is to be trained, as well as information that identifies that type of object. In at least one embodiment, training data might include a set of images that each includes a representation of a type of object, where each image also includes, or is associated with, a label, metadata, classification, or other piece of information identifying a type of object represented in a respective image. Various other types of data may be used as training data as well, as may include text data, audio data, video data, and so on. In at least one embodiment, training data 602 is provided as training input to a training manager 604. In at least one embodiment, training manager 604 can be a system or service that includes hardware and software, such as one or more computing devices executing a training application, for training a neural network (or other model or algorithm, etc.). In at least one embodiment, training manager 604 receives an instruction or request indicating a type of model to be used for training. In at least one embodiment, a model can be any appropriate statistical model, network, or algorithm useful for such purposes, as may include an artificial neural network, deep learning algorithm, learning classifier, Bayesian network, and so on. In at least one embodiment, training manager 604 can select an initial model, or other untrained model, from an appropriate repository 606 and utilize training data 602 to train a model, generating a trained model 608 (e.g., trained deep neural network) that can be used to classify similar types of data, or generate other such inferences. In at least one embodiment where training data is not used, an appropriate initial model can still be selected for training on input data per training manager 604.

In at least one embodiment, a model can be trained in a number of different ways, as may depend in part upon a type of model selected. In at least one embodiment, a machine learning algorithm can be provided with a set of training data, where a model is a model artifact created by a training process. In at least one embodiment, each instance of training data contains a correct answer (e.g., classification), which can be referred to as a target or target attribute. In at least one embodiment, a learning algorithm finds patterns in training data that map input data attributes to a target, an answer to be predicted, and a machine learning model is output that captures these patterns. In at least one embodiment, a machine learning model can then be used to obtain predictions on new data for which a target is not specified.

In at least one embodiment, a training manager 604 can select from a set of machine learning models including binary classification, multiclass classification, and regression models. In at least one embodiment, a type of model to be used can depend at least in part upon a type of target to be predicted. In at least one embodiment, machine learning models for binary classification problems predict a binary outcome, such as one of two possible classes. In at least one embodiment, a learning algorithm such as logistic regression can be used to train binary classification models. In at least one embodiment, machine learning models for multiclass classification problems allow predictions to be generated for multiple classes, such as to predict one of more than two outcomes. Multinomial logistic regression can be useful for training multiclass models. Machine learning models for regression problems predict a numeric value. Linear regression can be useful for training regression models.

In at least one embodiment, in order to train a machine learning model in accordance with one embodiment, a training manager must determine an input training data source, as well as other information such as a name of a data attribute that contains a target to be predicted, required data transformation instructions, and training parameters to control a learning algorithm. In at least one embodiment, during a training process, a training manager 604 may automatically select an appropriate learning algorithm based on a type of target specified in a training data source. In at least one embodiment, machine learning algorithms can accept parameters used to control certain properties of a training process and of a resulting machine learning model. These are referred to herein as training parameters. In at least one embodiment, if no training parameters are specified, a training manager can utilize default values that are known to work well for a large range of machine learning tasks. Examples of training parameters for which values can be specified include a maximum model size, maximum number of passes over training data, shuffle type, regularization type, learning rate, and regularization amount. Default settings may be specified, with options to adjust values to fine-tune performance.

In at least one embodiment, a maximum model size is a total size, in units of bytes, of patterns that are created during a training of a model. In at least one embodiment, a model may be created of a specified size by default, such as a model of 100 MB. If a training manager is unable to determine enough patterns to fill a model size, a smaller model may be created. If a training manager finds more patterns than will fit into a specified size, a maximum cut-off may be enforced by trimming patterns that least affect a quality of a learned model. Choosing a model size provides for control of a trade-off between a predictive quality of a model and a cost of use. In at least one embodiment, smaller models can cause a training manager to remove many patterns to fit within a maximum size limit, affecting a quality of predictions. In at least one embodiment, larger models may cost more to query for real-time predictions. In at least one embodiment, larger input data sets do not necessarily result in larger models because models store patterns, not input data. In at least one embodiment, if patterns are few and simple, a resulting model will be small. Input data that has a large number of raw attributes (input columns) or derived features (outputs of data transformations) will likely have more patterns found and stored during a training process.

In at least one embodiment, training manager 604 can make multiple passes or iterations over training data to attempt to discover patterns. In at least one embodiment, there may be a default number of passes, such as ten passes, while in at least one embodiment up to a maximum number of passes may be set, such as up to one hundred passes. In at least one embodiment there may be no maximum set, or there may be a convergence criterion or other factor set that will trigger an end to a training process. In at least one embodiment training manager 604 can monitor a quality of patterns (such as for model convergence) during training, and can automatically stop training when there are no more data points or patterns to discover. In at least one embodiment, data sets with only a few observations may require more passes over data to obtain sufficiently high model quality. Larger data sets may contain many similar data points, which can reduce a need for a large number of passes. A potential impact of choosing more data passes over data is that model training can takes longer and cost more in terms of resources and system utilization.

In at least one embodiment training data is shuffled before training, or between passes of training. In at least one embodiment, shuffling is a random or pseudo-random shuffling to generate a truly random ordering, although there may be some constraints in place to ensure that there is no grouping of certain types of data, or shuffled data may be reshuffled if such grouping exists, etc. In at least one embodiment, shuffling changes an order or arrangement in which data is utilized for training so that a training algorithm does not encounter groupings of similar types of data, or a single type of data for too many observations in succession. In at least one embodiment, a model might be trained to predict an object. In at least one embodiment, data might be sorted by object type before uploading. In at least one embodiment, an algorithm can then process data alphabetically by object type, encountering only data for a certain object type first. In at least one embodiment, a model will begin to learn patterns for that type of object. In at least one embodiment, a model will then encounter only data for a second object type, and will try to adjust a model to fit that object type, which can degrade patterns that fit that a first object type. This sudden switch from between object types can produce a model that does not learn how to predict object types accurately. In at least one embodiment, shuffling can be performed in at least one embodiment before a training data set is split into training and evaluation subsets, such that a relatively even distribution of data types is utilized for both stages. In at least one embodiment training manager 604 can automatically shuffle data using, for example, a pseudo-random shuffling technique.

In at least one embodiment, when creating a machine learning model in at least one embodiment, training manager 604 can enable a user to specify settings or apply custom options. In at least one embodiment, a user may specify one or more evaluation settings, indicating a portion of input data to be reserved for evaluating a predictive quality of a machine learning model. In at least one embodiment, a user may specify a policy that indicates which attributes and attribute transformations are available for model training. In at least one embodiment, a user may also specify various training parameters that control certain properties of a training process and of a resulting model.

In at least one embodiment, once a training manager has determined that training of a model is complete, such as by using at least one end criterion discussed herein, trained model 608 can be provided for use by a classifier 614 in classifying (or otherwise generating inferences for) validation data 612. In at least one embodiment, this involves a logical transition between a training mode for a model and an inference mode for a model. In at least one embodiment, however, trained model 608 will first be passed to an evaluator 610, which may include an application, process, or service executing on at least one computing resource (e.g., a CPU or GPU of at least one server) for evaluating a quality (or another such aspect) of a trained model. In at least one embodiment, a model is evaluated to determine whether this model will provide at least a minimum acceptable or threshold level of performance in predicting a target on new and future data. If not, training manager 604 can continue to train this model. In at least one embodiment, since future data instances will often have unknown target values, it can be desirable to check an accuracy metric of machine learning on data for which a target answer is known, and use this assessment as a proxy for predictive accuracy on future data.

In at least one embodiment, a model is evaluated using a subset of training data 602 that was provided for training. This subset can be determined using a shuffle and split approach as discussed above. In at least one embodiment, this evaluation data subset will be labeled with a target, and thus can act as a source of ground truth for evaluation. Evaluating a predictive accuracy of a machine learning model with same data that was used for training is not useful, as positive evaluations might be generated for models that remember training data instead of generalizing from it. In at least one embodiment, once training has completed, evaluation data subset is processed using trained model 608 and evaluator 610 can determine accuracy of this model by comparing ground truth data against corresponding output (or predictions/observations) of this model. In at least one embodiment, evaluator 610 in at least one embodiment can provide a summary or performance metric indicating how well predicted and true values match. In at least one embodiment, if a trained model does not satisfy at least a minimum performance criterion, or other such accuracy threshold, then training manager 604 can be instructed to perform further training, or in some instances try training a new or different model. In at least one embodiment, if trained model 608 satisfies relevant criteria, then a trained model can be provided for use by classifier 614.

In at least one embodiment, when creating and training a machine learning model, it can be desirable in at least one embodiment to specify model settings or training parameters that will result in a model capable of making accurate predictions. In at least one embodiment, parameters include a number of passes to be performed (forward and/or backward), regularization or refinement, model size, and shuffle type. In at least one embodiment, selecting model parameter settings that produce a best predictive performance on evaluation data might result in an overfitting of a model. In at least one embodiment, overfitting occurs when a model has memorized patterns that occur in training and evaluation data sources, but has failed to generalize patterns in data. Overfitting often occurs when training data includes all data used in an evaluation. In at least one embodiment, a model that has been over fit may perform well during evaluation, but may fail to make accurate predictions on new or otherwise validation data. In at least one embodiment, to avoid selecting an over fitted model as a best model, a training manager can reserve additional data to validate a performance of a model. For example, training data set might be divided into 60 percent for training, and 40 percent for evaluation or validation, which may be divided into two or more stages. In at least one embodiment, after selecting model parameters that work well for evaluation data, leading to convergence on a subset of validation data, such as half this validation data, a second validation may be executed with a remainder of this validation data to ensure performance of this model. If this model meets expectations on validation data, then this model is not overfitting data. In at least one embodiment, a test set or held-out set may be used for testing parameters. In at least one embodiment, using a second validation or testing step helps to select appropriate model parameters to prevent overfitting. However, holding out more data from a training process for validation makes less data available for training. This may be problematic with smaller data sets as there may not be sufficient data available for training. In at least one embodiment, an approach in such a situation is to perform cross-validation as discussed elsewhere herein.

In at least one embodiment, there are many metrics or insights that can be used to review and evaluate a predictive accuracy of a given model. In at least one embodiment, an evaluation outcome contains a prediction accuracy metric to report on an overall success of a model, as well as visualizations to help explore accuracy of a model beyond a prediction accuracy metric. An outcome can also provide an ability to review impact of setting a score threshold, such as for binary classification, and can generate alerts on criteria to check a validity of an evaluation. A choice of a metric and visualization can depend at least in part upon a type of model being evaluated.

In at least one embodiment, once trained and evaluated satisfactorily, a trained machine learning model can be used to build or support a machine learning application. In one embodiment building a machine learning application is an iterative process that involves a sequence of steps. In at least one embodiment, a core machine learning problem(s) can be framed in terms of what is observed and what answer a model is to predict. In at least one embodiment, data can then be collected, cleaned, and prepared to make data suitable for consumption by machine learning model training algorithms. This data can be visualized and analyzed to run sanity checks to validate a quality of data and to understand data. It might be that raw data (e.g., input variables) and answer data (e.g., a target) are not represented in a way that can be used to train a highly predictive model. Therefore, it may be desirable to construct more predictive input representations or features from raw variables. Resulting features can be fed to a learning algorithm to build models and evaluate a quality of models on data that was held out from model building. A model can then be used to generate predictions of a target answer for new data instances.

In at least one embodiment, in system 600 of FIG. 6, a trained model 610 after evaluation is provided, or made available, to a classifier 614 that is able to use a trained model to process validation data. In at least one embodiment, this may include, for example, data received from users or third parties that are not classified, such as query images that are looking for information about what is represented in those images. In at least one embodiment, validation data can be processed by a classifier using a trained model, and results 616 (such as classifications or predictions) that are produced can be sent back to respective sources or otherwise processed or stored. In at least one embodiment, and where such usage is permitted, these now-classified data instances can be stored to a training data repository, which can be used for further training of trained model 608 by a training manager. In at least one embodiment a model will be continually trained as new data is available, but in at least one embodiment these models will be retrained periodically, such as once a day or week, depending upon factors such as a size of a data set or complexity of a model.

In at least one embodiment, classifier 614 can include appropriate hardware and software for processing validation data 612 using a trained model. In at least one embodiment, a classifier will include one or more computer servers each having one or more graphics processing units (GPUs) that are able to process data. In at least one embodiment, configuration and design of GPUs can make them more desirable to use in processing machine learning data than CPUs or other such components. In at least one embodiment, a trained model in at least one embodiment can be loaded into GPU memory and a received data instance provided to a GPU for processing. GPUs can have a much larger number of cores than CPUs, and GPU cores can also be much less complex. In at least one embodiment, a given GPU may be able to process thousands of data instances concurrently via different hardware threads. In at least one embodiment, a GPU can also be configured to maximize floating point throughput, which can provide significant additional processing advantages for a large data set.

In at least one embodiment, even when using GPUs, accelerators, and other such hardware to accelerate tasks such as training of a model or classification of data using such a model, such tasks can still require significant time, resource allocation, and cost. In at least one embodiment, if a machine learning model is to be trained using 600 passes, and a data set includes 1,000,000 data instances to be used for training, then all million instances would need to be processed for each pass. Different portions of an architecture can also be supported by different types of devices. In at least one embodiment, training may be performed using a set of servers at a logically centralized location, as may be offered as a service, while classification of raw data may be performed by such a service or on a client device, among other such options. These devices may also be owned, operated, or controlled by a same entity or multiple entities.

Figure 7:
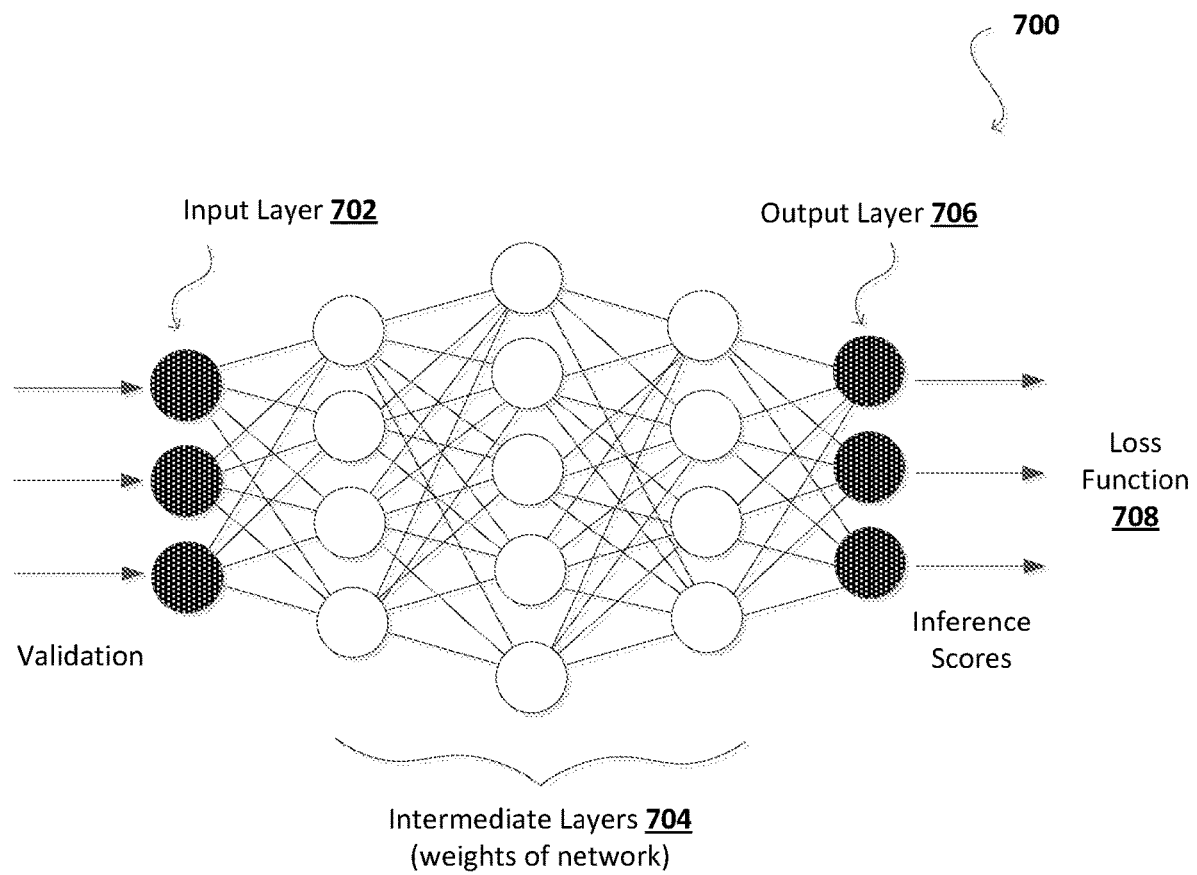
FIG. 7 illustrates layers of a statistical model that can be utilized, according to at least one embodiment.

In at least one embodiment, an example neural network 700 illustrated in FIG. 7 can be trained or otherwise utilized in at least one embodiment. In at least one embodiment, a statistical model is an artificial neural network (ANN) that includes a multiple layers of nodes, including an input layer 702, an output layer 706, and multiple layers 704 of intermediate nodes, often referred to as "hidden" layers, as internal layers and nodes are typically not visible or accessible in neural networks. In at least one embodiment, although only a few intermediate layers are illustrated for purposes of explanation, it should be understood that there is no limit to a number of intermediate layers that can be utilized, and any limit on layers will often be a factor of resources or time required for processed using a model. In at least one embodiment, there can be additional types of models, networks, algorithms, or processes used as well, as may include other numbers or selections of nodes and layers, among other such options. In at least one embodiment, validation data can be processed by layers of a network to generate a set of inferences, or inference scores, which can then be fed to a loss function 708.

In at least one embodiment, all nodes of a given layer are interconnected to all nodes of an adjacent layer. In at least one embodiment, nodes of an intermediate layer will then each be connected to nodes of two adjacent layers. In at least one embodiment, nodes are also referred to as neurons or connected units in some models, and connections between nodes are referred to as edges. Each node can perform a function for inputs received, such as by using a specified function. In at least one embodiment, nodes and edges can obtain different weightings during training, and individual layers of nodes can perform specific types of transformations on received input, where those transformations can also be learned or adjusted during training. In at least one embodiment, learning can be supervised or unsupervised learning, as may depend at least in part upon a type of information contained in a training data set. In at least one embodiment, various types of neural networks can be utilized, as may include a convolutional neural network (CNN) that includes a number of convolutional layers and a set of pooling layers, and have proven to be beneficial for applications such as image recognition. CNNs can also be easier to train than other networks due to a relatively small number of parameters to be determined.

In at least one embodiment, such a complex machine learning model can be trained using various tuning parameters. Choosing parameters, fitting a model, and evaluating a model are parts of a model tuning process, often referred to as hyperparameter optimization. Such tuning can involve introspecting an underlying model or data in at least one embodiment. In a training or production setting, a robust workflow can be important to avoid overfitting of hyperparameters as discussed elsewhere herein. Cross-validation and adding Gaussian noise to a training dataset are techniques that can be useful for avoiding overfitting to any one dataset. For hyperparameter optimization it may be desirable to keep training and validation sets fixed. In at least one embodiment, hyperparameters can be tuned in certain categories, as may include data preprocessing (such as translating words to vectors), CNN architecture definition (for example, filter sizes, number of filters), stochastic gradient descent (SGD) parameters (for example, learning rate), and regularization or refinement (for example, dropout probability), among other such options.

In at least one embodiment, instances of a dataset can be embedded into a lower dimensional space of a certain size during pre-processing. In at least one embodiment, a size of this space is a parameter to be tuned. In at least one embodiment, an architecture of a CNN contains many tunable parameters. A parameter for filter sizes can represent an interpretation of information that corresponds to a size of an instance that will be analyzed. In computational linguistics, this is known as an n-gram size. An example CNN uses three different filter sizes, which represent potentially different n-gram sizes. A number of filters per filter size can correspond to a depth of a filter. Each filter attempts to learn something different from a structure of an instance, such as a sentence structure for textual data. In a convolutional layer, an activation function can be a rectified linear unit and a pooling type set as max pooling. Results can then be concatenated into a single dimensional vector, and a last layer is fully connected onto a two-dimensional output. This corresponds to a binary classification to which an optimization function can be applied. One such function is an implementation of a Root Mean Square (RMS) propagation method of gradient descent, where example hyperparameters can include learning rate, batch size, maximum gradient normal, and epochs. With neural networks, regularization can be an extremely important consideration. In at least one embodiment input data may be relatively sparse. A main hyperparameter in such a situation can be a dropout at a penultimate layer, which represents a proportion of nodes that will not "fire" at each training cycle. An example training process can suggest different hyperparameter configurations based on feedback for a performance of previous configurations. This model can be trained with a proposed configuration, evaluated on a designated validation set, and performance reporting. This process can be repeated to, for example, trade off exploration (learning more about different configurations) and exploitation (leveraging previous knowledge to achieve better results).

As training CNNs can be parallelized and GPU-enabled computing resources can be utilized, multiple optimization strategies can be attempted for different scenarios. A complex scenario allows tuning model architecture and preprocessing and stochastic gradient descent parameters. This expands a model configuration space. In a basic scenario, only preprocessing and stochastic gradient descent parameters are tuned. There can be a greater number of configuration parameters in a complex scenario than in a basic scenario. Tuning in a joint space can be performed using a linear or exponential number of steps, iteration through an optimization loop for models. A cost for such a tuning process can be significantly less than for tuning processes such as random search and grid search, without any significant performance loss.

In at least one embodiment backpropagation can be utilized to calculate a gradient used for determining weights for a neural network. Backpropagation is a form of differentiation, and can be used by a gradient descent optimization algorithm to adjust weights applied to various nodes or neurons as discussed above. Weights can be determined using a gradient of a relevant loss function. Backpropagation can utilize a derivative of a loss function with respect to output generated by a statistical model. As mentioned, various nodes can have associated activation functions that define output of respective nodes. Various activation functions can be used as appropriate, as may include radial basis functions (RBFs) and sigmoids, which can be utilized by various support vector machines (SVMs) for transformation of data. An activation function of an intermediate layer of nodes is referred to herein as an inner product kernel. These functions can include, for example, identity functions, step functions, sigmoidal functions, ramp functions, and so on. Activation functions can also be linear or non-linear, among other such options.

In at least one embodiment, an untrained neural network is trained using a training dataset. In at least one embodiment, a training framework is a PyTorch framework, Tensorflow, Boost, Caffe, Microsoft Cognitive Toolkit/CNTK, MXNet, Chainer, Keras, Deeplearning4j, or other training framework. In at least one embodiment training framework trains an untrained neural network and enables it to be trained using processing resources described herein to generate a trained neural network. In at least one embodiment, weights may be chosen randomly or by pre-training using a deep belief network. In at least one embodiment, training may be performed in either a supervised, partially supervised, or unsupervised manner.

In at least one embodiment, untrained neural network is trained using supervised learning, wherein training dataset includes an input paired with a desired output for an input, or where training dataset includes input having a known output and an output of neural network is manually graded. In at least one embodiment, untrained neural network is trained in a supervised manner processes inputs from training dataset and compares resulting outputs against a set of expected or desired outputs. In at least one embodiment, errors are then propagated back through untrained neural network. In at least one embodiment, training framework adjusts weights that control untrained neural network. In at least one embodiment, training framework includes tools to monitor how well untrained neural network is converging towards a model, such as trained neural network, suitable to generating correct answers, such as in result, based on known input data, such as new data. In at least one embodiment, training framework trains untrained neural network repeatedly while adjust weights to refine an output of untrained neural network using a loss function and adjustment algorithm, such as stochastic gradient descent. In at least one embodiment, training framework trains untrained neural network until untrained neural network achieves a desired accuracy. In at least one embodiment, trained neural network can then be deployed to implement any number of machine learning operations.

In at least one embodiment, untrained neural network is trained using unsupervised learning, wherein untrained neural network attempts to train itself using unlabeled data. In at least one embodiment, unsupervised learning training dataset will include input data without any associated output data or "ground truth" data. In at least one embodiment, untrained neural network can learn groupings within training dataset and can determine how individual inputs are related to untrained dataset. In at least one embodiment, unsupervised training can be used to generate a self-organizing map, which is a type of trained neural network capable of performing operations useful in reducing dimensionality of new data. In at least one embodiment, unsupervised training can also be used to perform anomaly detection, which allows identification of data points in a new dataset that deviate from normal patterns of new dataset.

In at least one embodiment, semi-supervised learning may be used, which is a technique in which in training dataset includes a mix of labeled and unlabeled data. In at least one embodiment, training framework may be used to perform incremental learning, such as through transferred learning techniques. In at least one embodiment, incremental learning enables trained neural network to adapt to new data without forgetting knowledge instilled within network during initial training.

Figure 8:
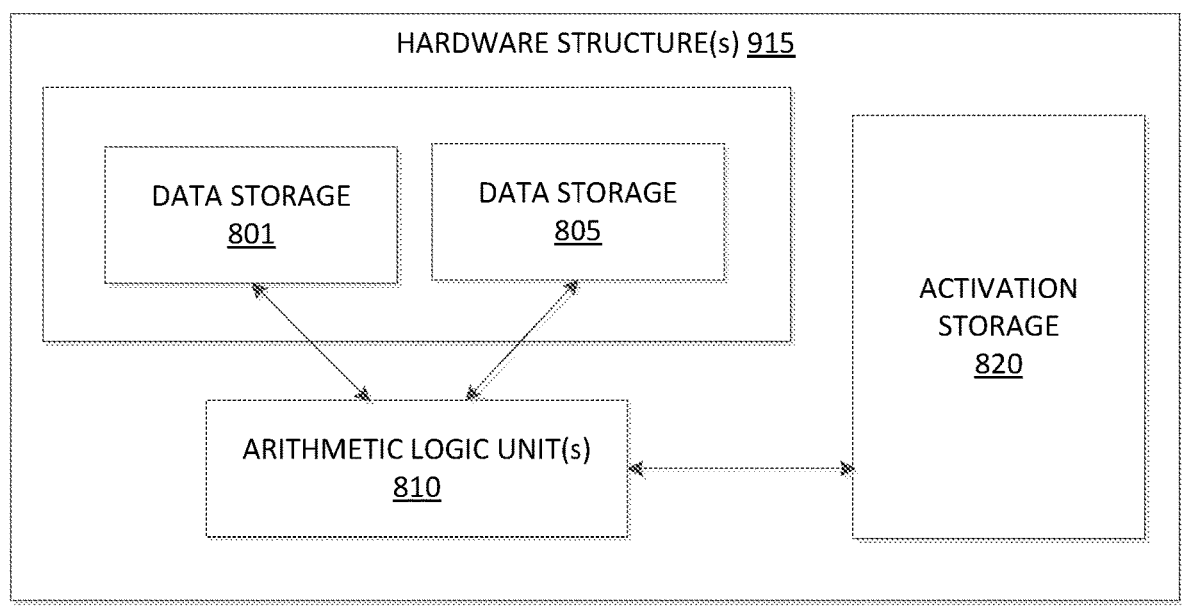
FIG. 8 illustrates inference and/or training logic, according to at least one embodiment.

FIG. 8 illustrates inference and/or training logic 815 used to perform inferencing and/or training operations associated with one or more embodiments. Details regarding inference and/or training logic 815 are provided below in conjunction with FIGS. 8 and/or 9.

In at least one embodiment, inference and/or training logic 815 may include, without limitation, code and/or data storage 801 to store forward and/or output weight and/or input/output data, and/or other parameters to configure neurons or layers of a neural network trained and/or used for inferencing in aspects of one or more embodiments. In at least one embodiment, training logic 815 may include, or be coupled to code and/or data storage 801 to store graph code or other software to control timing and/or order, in which weight and/or other parameter information is to be loaded to configure, logic, including integer and/or floating point units (collectively, arithmetic logic units (ALUs). In at least one embodiment, code, such as graph code, loads weight or other parameter information into processor ALUs based on an architecture of a neural network to which this code corresponds. In at least one embodiment, code and/or data storage 801 stores weight parameters and/or input/output data of each layer of a neural network trained or used in conjunction with one or more embodiments during forward propagation of input/output data and/or weight parameters during training and/or inferencing using aspects of one or more embodiments. In at least one embodiment, any portion of code and/or data storage 801 may be included with other on-chip or off-chip data storage, including a processor's L1, L2, or L3 cache or system memory.

In at least one embodiment, any portion of code and/or data storage 801 may be internal or external to one or more processors or other hardware logic devices or circuits. In at least one embodiment, code and/or code and/or data storage 801 may be cache memory, dynamic randomly addressable memory ("DRAM"), static randomly addressable memory ("SRAM"), non-volatile memory (e.g., Flash memory), or other storage. In at least one embodiment, choice of whether code and/or code and/or data storage 801 is internal or external to a processor, for example, or comprised of DRAM, SRAM, Flash or some other storage type may depend on available storage on-chip versus off-chip, latency requirements of training and/or inferencing functions being performed, batch size of data used in inferencing and/or training of a neural network, or some combination of these factors.

In at least one embodiment, inference and/or training logic 815 may include, without limitation, a code and/or data storage 805 to store backward and/or output weight and/or input/output data corresponding to neurons or layers of a neural network trained and/or used for inferencing in aspects of one or more embodiments. In at least one embodiment, code and/or data storage 805 stores weight parameters and/or input/output data of each layer of a neural network trained or used in conjunction with one or more embodiments during backward propagation of input/output data and/or weight parameters during training and/or inferencing using aspects of one or more embodiments. In at least one embodiment, training logic 815 may include, or be coupled to code and/or data storage 805 to store graph code or other software to control timing and/or order, in which weight and/or other parameter information is to be loaded to configure, logic, including integer and/or floating point units (collectively, arithmetic logic units (ALUs). In at least one embodiment, code, such as graph code, loads weight or other parameter information into processor ALUs based on an architecture of a neural network to which this code corresponds. In at least one embodiment, any portion of code and/or data storage 805 may be included with other on-chip or off-chip data storage, including a processor's L1, L2, or L3 cache or system memory. In at least one embodiment, any portion of code and/or data storage 805 may be internal or external to on one or more processors or other hardware logic devices or circuits. In at least one embodiment, code and/or data storage 805 may be cache memory, DRAM, SRAM, non-volatile memory (e.g., Flash memory), or other storage. In at least one embodiment, choice of whether code and/or data storage 805 is internal or external to a processor, for example, or comprised of DRAM, SRAM, Flash or some other storage type may depend on available storage on-chip versus off-chip, latency requirements of training and/or inferencing functions being performed, batch size of data used in inferencing and/or training of a neural network, or some combination of these factors.

In at least one embodiment, code and/or data storage 801 and code and/or data storage 805 may be separate storage structures. In at least one embodiment, code and/or data storage 801 and code and/or data storage 805 may be same storage structure. In at least one embodiment, code and/or data storage 801 and code and/or data storage 805 may be partially same storage structure and partially separate storage structures. In at least one embodiment, any portion of code and/or data storage 801 and code and/or data storage 805 may be included with other on-chip or off-chip data storage, including a processor's L1, L2, or L3 cache or system memory.

In at least one embodiment, inference and/or training logic 915 may include, without limitation, one or more arithmetic logic unit(s) ("ALU(s)") 910, including integer and/or floating point units, to perform logical and/or mathematical operations based, at least in part on, or indicated by, training and/or inference code (e.g., graph code), a result of which may produce activations (e.g., output values from layers or neurons within a neural network) stored in an activation storage 920 that are functions of input/output and/or weight parameter data stored in code and/or data storage 901 and/or code and/or data storage 905. In at least one embodiment, activations stored in activation storage 920 are generated according to linear algebraic and or matrix-based mathematics performed by ALU(s) 910 in response to performing instructions or other code, wherein weight values stored in code and/or data storage 905 and/or code and/or data storage 901 are used as operands along with other values, such as bias values, gradient information, momentum values, or other parameters or hyperparameters, any or all of which may be stored in code and/or data storage 905 or code and/or data storage 901 or another storage on or off-chip.

In at least one embodiment, ALU(s) 910 are included within one or more processors or other hardware logic devices or circuits, whereas in another embodiment, ALU(s) 910 may be external to a processor or other hardware logic device or circuit that uses them (e.g., a co-processor). In at least one embodiment, ALUs 910 may be included within a processor's execution units or otherwise within a bank of ALUs accessible by a processor's execution units either within same processor or distributed between different processors of different types (e.g., central processing units, graphics processing units, fixed function units, etc.). In at least one embodiment, code and/or data storage 901, code and/or data storage 905, and activation storage 920 may be on same processor or other hardware logic device or circuit, whereas in another embodiment, they may be in different processors or other hardware logic devices or circuits, or some combination of same and different processors or other hardware logic devices or circuits. In at least one embodiment, any portion of activation storage 920 may be included with other on-chip or off-chip data storage, including a processor's L1, L2, or L3 cache or system memory. Furthermore, inferencing and/or training code may be stored with other code accessible to a processor or other hardware logic or circuit and fetched and/or processed using a processor's fetch, decode, scheduling, execution, retirement and/or other logical circuits.

In at least one embodiment, activation storage 920 may be cache memory, DRAM, SRAM, non-volatile memory (e.g., Flash memory), or other storage. In at least one embodiment, activation storage 920 may be completely or partially within or external to one or more processors or other logical circuits. In at least one embodiment, choice of whether activation storage 920 is internal or external to a processor, for example, or comprised of DRAM, SRAM, Flash or some other storage type may depend on available storage on-chip versus off-chip, latency requirements of training and/or inferencing functions being performed, batch size of data used in inferencing and/or training of a neural network, or some combination of these factors. In at least one embodiment, inference and/or training logic 915 illustrated in FIG. 8 may be used in conjunction with an application-specific integrated circuit ("ASIC"), such as Tensorflow® Processing Unit from Google, an inference processing unit (IPU) from Graphcore™, or a Nervana® (e.g., "Lake Crest") processor from Intel Corp. In at least one embodiment, inference and/or training logic 1015 illustrated in FIG. 8 may be used in conjunction with central processing unit ("CPU") hardware, graphics processing unit ("GPU") hardware or other hardware, such as field programmable gate arrays ("FPGAs").

Figure 9:
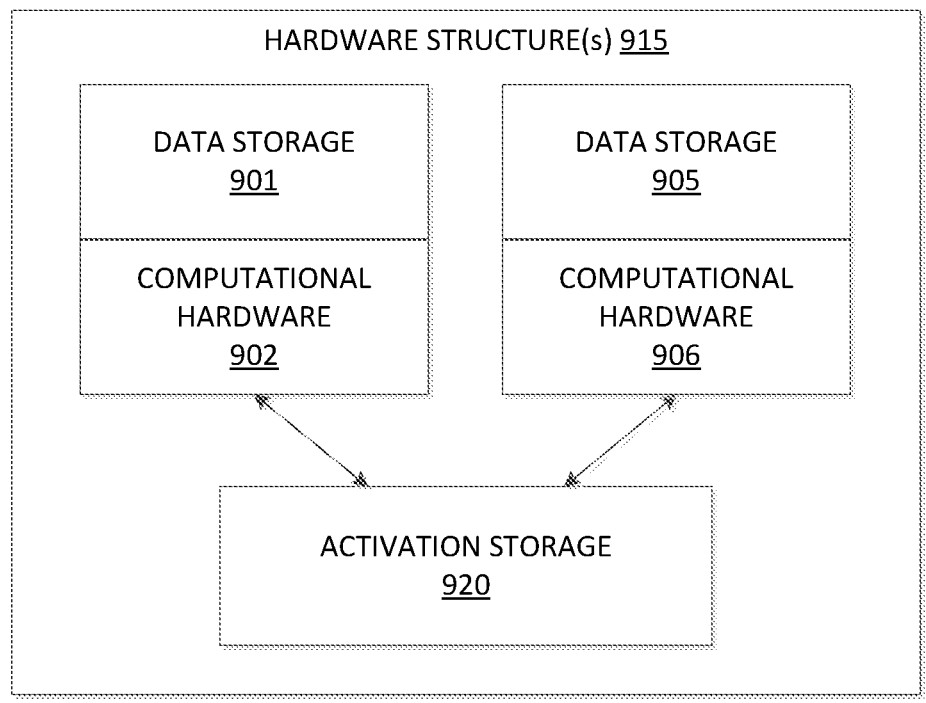
FIG. 9 illustrates inference and/or training logic, according to at least one embodiment.

FIG. 9 illustrates inference and/or training logic 915, according to at least one or more embodiments. In at least one embodiment, inference and/or training logic 915 may include, without limitation, hardware logic in which computational resources are dedicated or otherwise exclusively used in conjunction with weight values or other information corresponding to one or more layers of neurons within a neural network. In at least one embodiment, inference and/or training logic 915 illustrated in FIG. 9 may be used in conjunction with an application-specific integrated circuit (ASIC), such as Tensorflow® Processing Unit from Google, an inference processing unit (IPU) from Graphcore™, or a Nervana® (e.g., "Lake Crest") processor from Intel Corp. In at least one embodiment, inference and/or training logic 915 illustrated in FIG. 9 may be used in conjunction with central processing unit (CPU) hardware, graphics processing unit (GPU) hardware or other hardware, such as field programmable gate arrays (FPGAs). In at least one embodiment, inference and/or training logic 915 includes, without limitation, code and/or data storage 901 and code and/or data storage 905, which may be used to store code (e.g., graph code), weight values and/or other information, including bias values, gradient information, momentum values, and/or other parameter or hyperparameter information. In at least one embodiment illustrated in FIG. 9, each of code and/or data storage 901 and code and/or data storage 905 is associated with a dedicated computational resource, such as computational hardware 902 and computational hardware 906, respectively. In at least one embodiment, each of computational hardware 902 and computational hardware 906 comprises one or more ALUs that perform mathematical functions, such as linear algebraic functions, only on information stored in code and/or data storage 901 and code and/or data storage 905, respectively, result of which is stored in activation storage 920.

In at least one embodiment, each of code and/or data storage 901 and 905 and corresponding computational hardware 902 and 906, respectively, correspond to different layers of a neural network, such that resulting activation from one "storage/computational pair 901/902" of code and/or data storage 901 and computational hardware 902 is provided as an input to "storage/computational pair 905/906" of code and/or data storage 905 and computational hardware 906, in order to mirror conceptual organization of a neural network. In at least one embodiment, each of storage/computational pairs 901/902 and 905/906 may correspond to more than one neural network layer. In at least one embodiment, additional storage/computation pairs (not shown) subsequent to or in parallel with storage computation pairs 901/902 and 905/906 may be included in inference and/or training logic 915.

Other variations are within spirit of present disclosure. Thus, while disclosed techniques are susceptible to various modifications and alternative constructions, certain illustrated embodiments thereof are shown in drawings and have been described above in detail. It should be understood, however, that there is no intention to limit disclosure to specific form or forms disclosed, but on contrary, intention is to cover all modifications, alternative constructions, and equivalents falling within spirit and scope of disclosure, as defined in appended claims.

Use of terms "a" and "an" and "the" and similar referents in context of describing disclosed embodiments (especially in context of following claims) are to be construed to cover both singular and plural, unless otherwise indicated herein or clearly contradicted by context, and not as a definition of a term. Terms "comprising," "having," "including," and "containing" are to be construed as open-ended terms (meaning "including, but not limited to,") unless otherwise noted. term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within range, unless otherwise indicated herein and each separate value is incorporated into specification as if it were individually recited herein. use of term "set" (e.g., "a set of items") or "subset" unless otherwise noted or contradicted by context, is to be construed as a nonempty collection comprising one or more members. Further, unless otherwise noted or contradicted by context, term "subset" of a corresponding set does not necessarily denote a proper subset of corresponding set, but subset and corresponding set may be equal.

Conjunctive language, such as phrases of form "at least one of A, B, and C," or "at least one of A, B and C," unless specifically stated otherwise or otherwise clearly contradicted by context, is otherwise understood with context as used in general to present that an item, term, etc., may be either A or B or C, or any nonempty subset of set of A and B and C. For instance, in illustrative example of a set having three members, conjunctive phrases "at least one of A, B, and C" and "at least one of A, B and C" refer to any of following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present. In addition, unless otherwise noted or contradicted by context, term "plurality" indicates a state of being plural (e.g., "a plurality of items" indicates multiple items). number of items in a plurality is at least two, but can be more when so indicated either explicitly or by context. Further, unless stated otherwise or otherwise clear from context, phrase "based on" means "based at least in part on" and not "based solely on."

Operations of processes described herein can be performed in any suitable order unless otherwise indicated herein or otherwise clearly contradicted by context. In at least one embodiment, a process such as those processes described herein (or variations and/or combinations thereof) is performed under control of one or more computer systems configured with executable instructions and is implemented as code (e.g., executable instructions, one or more computer programs or one or more applications) executing collectively on one or more processors, by hardware or combinations thereof. In at least one embodiment, code is stored on a computer-readable storage medium, for example, in form of a computer program comprising a plurality of instructions executable by one or more processors. In at least one embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In at least one embodiment, code (e.g., executable code or source code) is stored on a set of one or more non-transitory computer-readable storage media having stored thereon executable instructions (or other memory to store executable instructions) that, when executed (La, as a result of being executed) by one or more processors of a computer system, cause computer system to perform operations described herein. set of non-transitory computer-readable storage media, in at least one embodiment, comprises multiple non-transitory computer-readable storage media and one or more of individual non-transitory storage media of multiple non-transitory computer-readable storage media lack all of code while multiple non-transitory computer-readable storage media collectively store all of code. In at least one embodiment, executable instructions are executed such that different instructions are executed by different processors— for example, a non-transitory computer-readable storage medium store instructions and a main central processing unit ("CPU") executes some of instructions while a graphics processing unit ("GPU") executes other instructions. In at least one embodiment, different components of a computer system have separate processors and different processors execute different subsets of instructions.

Accordingly, in at least one embodiment, computer systems are configured to implement one or more services that singly or collectively perform operations of processes described herein and such computer systems are configured with applicable hardware and/or software that enable performance of operations. Further, a computer system that implements at least one embodiment of present disclosure is a single device and, in another embodiment, is a distributed computer system comprising multiple devices that operate differently such that distributed computer system performs operations described herein and such that a single device does not perform all operations.

Use of any and all examples, or exemplary language (e.g., "such as") provided herein, is intended merely to better illuminate embodiments of disclosure and does not pose a limitation on scope of disclosure unless otherwise claimed. No language in specification should be construed as indicating any non-claimed element as essential to practice of disclosure.

All references, including publications, patent applications, and patents, cited herein are hereby incorporated by reference to same extent as if each reference were individually and specifically indicated to be incorporated by reference and were set forth in its entirety herein.

In description and claims, terms "coupled" and "connected," along with their derivatives, may be used. It should be understood that these terms may be not intended as synonyms for each other. Rather, in particular examples, "connected" or "coupled" may be used to indicate that two or more elements are in direct or indirect physical or electrical contact with each other. "Coupled" may also mean that two or more elements are not in direct contact with each other, but yet still co-operate or interact with each other.

Unless specifically stated otherwise, it may be appreciated that throughout specification terms such as "processing," "computing," "calculating," "determining," or like, refer to action and/or processes of a computer or computing system, or similar electronic computing device, that manipulate and/or transform data represented as physical, such as electronic, quantities within computing system's registers and/or memories into other data similarly represented as physical quantities within computing system's memories, registers or other such information storage, transmission or display devices.

In a similar manner, term "processor" may refer to any device or portion of a device that processes electronic data from registers and/or memory and transform that electronic data into other electronic data that may be stored in registers and/or memory. As non-limiting examples, "processor" may be a CPU or a GPU. A "computing platform" may comprise one or more processors. As used herein, "software" processes may include, for example, software and/or hardware entities that perform work over time, such as tasks, threads, and intelligent agents. Also, each process may refer to multiple processes, for carrying out instructions in sequence or in parallel, continuously or intermittently. terms "system" and "method" are used herein interchangeably insofar as system may embody one or more methods and methods may be considered a system.

In present document, references may be made to obtaining, acquiring, receiving, or inputting analog or digital data into a subsystem, computer system, or computer-implemented machine. process of obtaining, acquiring, receiving, or inputting analog and digital data can be accomplished in a variety of ways such as by receiving data as a parameter of a function call or a call to an application programming interface. In some implementations, process of obtaining, acquiring, receiving, or inputting analog or digital data can be accomplished by transferring data via a serial or parallel interface. In another implementation, process of obtaining, acquiring, receiving, or inputting analog or digital data can be accomplished by transferring data via a computer network from providing entity to acquiring entity. References may also be made to providing, outputting, transmitting, sending, or presenting analog or digital data. In various examples, process of providing, outputting, transmitting, sending, or presenting analog or digital data can be accomplished by transferring data as an input or output parameter of a function call, a parameter of an application programming interface or interprocess communication mechanism.

Although discussion above sets forth example implementations of described techniques, other architectures may be used to implement described functionality, and are intended to be within scope of this disclosure. Furthermore, although specific distributions of responsibilities are defined above for purposes of discussion, various functions and responsibilities might be distributed and divided in different ways, depending on circumstances.

Furthermore, although subject matter has been described in language specific to structural features and/or methodological acts, it is to be understood that subject matter claimed in appended claims is not necessarily limited to specific features or acts described. Rather, specific features and acts are disclosed as exemplary forms of implementing the claims.

What is claimed is:

1. A processor comprising:
    one or more arithmetic logic units (ALUs) to be configured to perform a matrix computation by:
    receiving a request for the matrix computation, the request including at least one matrix and the matrix computation to be performed;
    providing, to a neural network, a candidate kernel list and characteristics of the at least one matrix and the matrix computation;
    generating, based at least on the candidate kernel list, a ranked list of kernels using the neural network, the ranking based on a relevancy score determined using the neural network for at least one kernel in the ranked list;
    selecting a first kernel from the ranked list of kernels;
    generating a result for the matrix computation using the at least one matrix and the first kernel; and
    providing the result.

2. The one or more ALUs of claim 1, further configured to perform the matrix computation by:
    generating the candidate kernel list based on the at least one matrix and the matrix computation; and
    providing the candidate kernel list to the neural network with the characteristics of the at least one matrix and matrix computation, wherein the generated ranked list of kernels includes only kernels that are included in the candidate kernel list.

3. The one or more ALUs of claim 2, further configured to perform the matrix computation by:
identifying a kernel processor configured to generate the result;
removing one or more kernels from the candidate kernel list based on one or more hardware constraints of the kernel processor.

4. The processor of claim 1, wherein the request is received via an application programming interface (API).

5. The one or more ALUs of claim 1, further configured to perform the matrix computation by:
identifying hardware behavior information; and
providing the hardware behavior information to the neural network with the characteristics of the at least one matrix and the matrix computation.

6. The processor of claim 1, wherein the matrix computation is a general matrix multiply (GeMM).

7. The one or more ALUs of claim 1, further configured to perform the matrix computation by:
determining a second kernel for the at least one matrix and the matrix computation;
comparing the ranked list of kernels by the neural network to the second kernel; and
generating additional training data for the neural network based on the at least one matrix and the second kernel.

8. The processor of claim 7, wherein generating the additional training data includes:
determining a class for the at least one matrix;
generating input based on the class; and
providing the additional training data to the neural network.

9. A system, comprising:
one or more processors to be configured to perform, using one or more neural networks:
receiving a request for the matrix computation, the request including at least one matrix and the matrix computation to be performed;
providing, to a neural network, a candidate kernel list and characteristics of the at least one matrix and the matrix computation;
generating, based at least on the candidate kernel list, a ranked list of kernels using the neural network, the ranking based on a relevancy score determined using the neural network for at least one kernel in the ranked list;
selecting a first kernel from the ranked list of kernels;
generating a result for the matrix computation using the at least one matrix and the first kernel; and
providing the result; and
one or more memories to store parameters corresponding to the one or more neural networks.

10. The system of claim 9, wherein the processors are further configured to perform:
generating the candidate kernel list based on the at least one matrix and the matrix computation; and
providing the candidate kernel list to the neural network with the at least one matrix and matrix computation, wherein the generated ranked list of kernels includes only kernels that are included in the candidate kernel list.

11. The system of claim 10, wherein the processors are further configured to perform:
identifying a kernel processor configured to generate the result;
removing one or more kernels from the candidate kernel list on one or more hardware constraints of the kernel processor.

12. The system of claim 9, wherein the processors are further configured to perform:
identifying hardware behavior information; and
providing the hardware behavior information to the neural network with the characteristics of the at least one matrix and the matrix computation.

13. The system of claim 9, wherein the processors are further configured to perform:
determining a second kernel for the at least one matrix and the matrix computation;
comparing the ranked list of kernels by the neural network to the second kernel; and
generating additional training data for the neural network based on the at least one matrix and the second kernel.

14. The system of claim 13, wherein the processors are further configured to perform:
determining a class for the at least one matrix;
generating input based on the class; and
providing the additional training data to the neural network.

15. A computer-readable storage medium having stored thereon a set of instructions, which if performed by one or more processors, cause the one or more processors to at least:
provide a request for the matrix computation, the request including at least one matrix and the matrix computation to be performed, the request provided to a system configured to:
provide, to a neural network, a candidate kernel list and characteristics of the at least one matrix and the matrix computation;
generate, based at least on the candidate kernel list, a ranked list of kernels using the neural network, the ranking based on a relevancy score determined using the neural network for at least one kernel in the ranked list;
select a first kernel from the ranked list of kernels;
generate a result for the matrix computation using the at least one matrix and the first kernel; and
provide the result in response to the request.

16. The computer-readable storage medium of claim 15, wherein the request is provided via an application programming interface (API).

17. The computer-readable storage medium of claim 15, wherein the matrix computation is a general matrix multiply (GeMM).

18. The computer-readable storage medium of claim 15, wherein the system is further configured to:
determine a second kernel for the at least one matrix and the matrix computation;
compare the ranked list of kernels by the neural network to the second kernel; and
generate additional training data for the neural network based on the at least one matrix and the second kernel.

19. The computer-readable storage medium of claim 15, wherein the instructions further include instructions to:
determine a class for the at least one matrix; and
provide the class with the request.

20. The computer-readable storage medium of claim 19, wherein the system is further configured to:
identify hardware behavior information; and provide the hardware behavior information to the neural network with the characteristics of the at least one matrix and the matrix computation.

\* \* \* \* \*